(12) United States Patent
Fouad et al.

(10) Patent No.: US 12,549,962 B2
(45) Date of Patent: Feb. 10, 2026

(54) ENHANCED FR2 TRACKING PROCEDURES FOR NR SIDELINK SYSTEMS

(71) Applicant: Samsung Electronics Co., Ltd., Suwon-si (KR)

(72) Inventors: Yaser Mohamed Mostafa Kamal Fouad, San Diego, CA (US); Philippe Jean Marc Michel Sartori, Naperville, IL (US); Mohamed Awadin, Plymouth Meeting, PA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 526 days.

(21) Appl. No.: 17/992,531

(22) Filed: Nov. 22, 2022

(65) Prior Publication Data

US 2023/0209365 A1    Jun. 29, 2023

Related U.S. Application Data

(60) Provisional application No. 63/289,388, filed on Dec. 14, 2021.

(51) Int. Cl.
| | |
|---|---|
| *H04W 16/28* | (2009.01) |
| *H04L 5/00* | (2006.01) |
| *H04W 24/10* | (2009.01) |

(52) U.S. Cl.
CPC .......... *H04W 16/28* (2013.01); *H04L 5/0051* (2013.01); *H04W 24/10* (2013.01)

(58) Field of Classification Search
None
See application file for complete search history.

(56) References Cited

U.S. PATENT DOCUMENTS

| | | | |
|---|---|---|---|
| 11,082,118 B2 | 8/2021 | Raghavan et al. | |
| 11,330,566 B2 | 5/2022 | Kim et al. | |
| 2020/0252990 A1* | 8/2020 | Ganesan | H04W 76/19 |
| 2020/0366360 A1* | 11/2020 | Kotecha | H04J 11/0076 |
| 2021/0176735 A1* | 6/2021 | Deng | H04W 72/543 |
| 2022/0022068 A1 | 1/2022 | Ryu et al. | |
| 2022/0046430 A1* | 2/2022 | Liu | H04B 7/0695 |
| 2022/0053460 A1 | 2/2022 | Yu et al. | |
| 2022/0094499 A1* | 3/2022 | Wang | H04W 76/14 |
| 2022/0116791 A1 | 4/2022 | Lin et al. | |
| 2022/0272679 A1* | 8/2022 | Wang | H04W 72/20 |
| 2022/0399927 A1* | 12/2022 | Tsai | H04B 7/0617 |
| 2023/0095891 A1* | 3/2023 | Xue | H04L 5/0094 |

(Continued)

*Primary Examiner* — Lonnie V Sweet
(74) *Attorney, Agent, or Firm* — Womble Bond Dickinson (US) LLP

(57) ABSTRACT

A system and a method are disclosed for configuring one or more user equipment (UE) devices in a multi-UE arrangement to communicate according to a preferred frequency range 2 (FR2) sidelink (SL) configuration. The systems and method involve determining, by a first user equipment (UE), one or more beam measurement reference signals corresponding to one or more beamform configurations from a special slot within a regular resource pool and relating to one or more beamform configurations and configuring the first UE, based at least in part on the one or more beam measurement reference signals, to transmit and receive FR2 SL transmissions with the second UE according to at least a beamform configuration of the one or more beamform configurations.

20 Claims, 6 Drawing Sheets

(56) References Cited

U.S. PATENT DOCUMENTS

| | | | |
|---|---|---|---|
| 2023/0126503 A1* | 4/2023 | Ökvist | H04B 7/0617 |
| | | | 375/267 |
| 2023/0354385 A1* | 11/2023 | Oh | H04B 17/336 |
| 2024/0015765 A1* | 1/2024 | Li | H04W 72/40 |
| 2024/0259142 A1* | 8/2024 | Narula | H04L 1/1896 |

* cited by examiner

ENHANCED FR2 TRACKING PROCEDURES FOR NR SIDELINK SYSTEMS

CROSS-REFERENCE TO RELATED APPLICATION

This application claims the priority benefit under 35 U.S.C. § 119 (e) of U.S. Provisional Application No. 63/289,388, filed on Dec. 14, 2021, the disclosures of which are incorporated by reference in their entirety as if fully set forth herein.

TECHNICAL FIELD

The disclosure generally relates to new radio (NR) sidelink (SL) communications. More particularly, the subject matter disclosed herein relates to improved NR SL communications systems via improved Frequency Range 2 (FR2) tracking procedures.

SUMMARY

The following is a list of acronyms used in this disclosure and their respective definitions:

| Abbreviation | Definition |
| --- | --- |
| SL | Sidelink |
| FR2 | Frequency Range 2 |
| NR | New Radio |
| UE | User Equipment |
| ACK/NACK | Acknowledgement/Negative Acknowledgement |
| Transmitting UE | Transmitting User Equipment |
| Receiving UE | Receiving User Equipment |
| gNB | Base Station (gNodeB) |
| SCI | Sidelink Control Information |
| PUCCH | Sidelink Uplink Control Channel |
| CBR | Channel Busy Ratio |
| RSRP | Reference Signal Received Power |
| HARQ | Hybrid Automatic Repeat Request |
| PSFCH | Sidelink Feedback Channel |
| V2X | Vehicle to Everything |

NR SL is poised to expand significantly in the near future and play a large of role in device connectivity. As a result, SL connectivity will improve a wide variety of applications, due to its distributed design that allows in-coverage and out-of-coverage support and its short distance links that utilize low transmit power. However, to realize the potential capabilities of sidelink communications, it is essential that such systems are able to support high data rate communication with high reliability.

Future releases of NR SL are expected to harvest the higher bandwidths available in FR2 and beyond to support high data rate applications. However, for this to be achieved, UEs must perform beam tracking to maintain the link quality during the communication. Unlike direct links, beam tracking is harder to realize in sidelink communications since both the transmitting and receiving UEs are expected to be mobile (i.e. non-static with respect to a geographic position). Despite the advantages of using frequency range 2 (FR2) for sidelink communication in expanding the available bandwidth and subsequently the data rate, a major drawback is the need for beamforming. Unlike direct link operations, in sidelink communications high mobility is involved whereby both the transmitter and the receiver are expected to be mobile. In addition, there is a higher probability of line of sight obstruction (i.e. a third party object physically blocking the path of a beam between a transmitting UE and a receiving UE).

Thus, there is a need for a method of FR2 beam tracking to allow the transmitting and receiving UEs to dynamically adjust beam direction to maintain line of sight and subsequently achieve higher throughput, especially as FR2 sidelink operation becomes more ubiquitous. This disclosure introduces a novel procedure for beam tracking in sidelink systems to resolve the difficulties posed by mobile FR2 sidelink systems. Methods and systems described herein enable UEs to recognize and assess the quality of different beams and accordingly switch to the best beam to maintain the link quality. Accordingly, a UE may recover from being subjected to a serving beam with low quality by discovering and utilizing another beam with higher quality. The proposed procedure will further support different scenario such as groupcast and unicast communications.

The disclosures below describe novel FR2 sidelink methods and systems, whereby the transmitting and receiving UEs are actively engaged in communications (i.e., discovery was performed and the best beam was identified for communications). The novel embodiments allow for procedures to continuously monitor the selected FR2 beam quality and accordingly switch to different beams when necessary to maintain the link quality. Such procedures solve the inherent issues with FR2 beamforming described above my allowing for improve beam selection and communication in both static and mobile scenarios and situations including blocking third party objects.

In an example embodiment, a method comprises determining, by a first user equipment (UE), one or more beam measurement reference signals corresponding to one or more beamform configurations for transmitting frequency range 2 (FR2) sidelink (SL) transmissions to a second UE, wherein a special slot within a regular resource pool comprises the one or more beam reference signals and the one or more beam measurement reference signals relate to one or more beamform configurations; and configuring the first UE, based at least in part on the one or more beam measurement reference signals, to transmit and receive FR2 SL transmissions with the second UE according to at least a beamform configuration of the one or more beamform configurations.

In an embodiment, the one or more beam measurement reference signals are previously received from the second UE and the beamform configuration of the one or more beamform configurations is a preferred-candidate beamform configuration as determined from the one or more beam measurement reference signals.

In an embodiment, the method further includes maintaining a configuration of the first UE corresponding to a previous beamform configuration of the one or more beamform configurations; and determining, based at least on one or more signals received from the second UE, that the previous beamform configuration of the one or more beamform configurations is deteriorating. In a further embodiment, the one or more beam reference signals are generated in response to the determination that the previous beamform configuration is deteriorating; the one or more beam measurement reference signals are sent from the first UE to the second UE; and configuring the first UE to transmit and receive FR2 SL transmissions according to the beamform configuration is further based at least in part on a beamform sweeping signal received from the second UE after the second UE has collected measurement data.

In an embodiment, the format of the special slot is configurable per resource pool and is dependent on a priority.

In an embodiment, the one or more beam measurement reference signals include a PHY signaling field indicating the presence of the beam sweeping information in the special slot.

In an embodiment, the method further includes sending, by the first UE, the special slot comprising the one or more beam measurement reference signals to the second UE; and receiving, from the second UE, a signal corresponding to a beam sweeping performed with the beam sweeping information, wherein configuring the first UE to transmit and receive FR2 SL transmissions in based on the signal corresponding to the beam sweeping.

In an embodiment, the in an embodiment, the first UE generates the special slot including beam sweeping information in response to counting a consecutive number of NACK signals received at the first UE or based on a request received from the second UE.

In an embodiment, the method further comprises receiving, from the second UE, an indication of a first set of multiple beamform configurations for transmitting and receiving data; and receiving, from a third UE, an indication of a second set of multiple beamform configurations for transmitting and receiving data; wherein configuring the first UE according to the beamform configuration of the one or more beamform configurations is based on an overlap between the first set of multiple beamform configurations and the second set of multiple beamform configurations.

In an embodiment, configuring the first UE to transmit and receive FR2 SL transmissions according to the beamform configuration is further based on a decoding of a bit-signal received from the second UE based on a predetermined coding paradigm.

In an embodiment, configuring the first UE to transmit and receive FR2 SL transmissions according to the beamform configuration comprises adjusting a beam width of the beamform configuration. In a further embodiment, adjusting the beam width of the beamform configuration comprises widening a beam width is response to a reduction in latency when searching for alternative beams. In another further embodiment, adjusting the beam width of the beamform configuration comprises narrowing a beamwidth to improve a link quality between the first UE and the second UE when a relative distance between UEs is stable or shrinking.

In an embodiment, the first UE is further configured to transmit and receive PSSCH signals with the second UE over FR2 and PSCCH signals over FR1.

In an embodiment, the one or more beamform configurations comprises at least a first beamform configuration including a first width for PSCCH transmissions and a second beamform configuration including a second size that is different from the first size for PSSCH transmissions.

In an embodiment, the one or more beam measurement reference signals corresponds to one or more differential indexes; and the beamform configuration for which the first UE is configured to transmit and receive FR2 SL transmissions is determined based on at least one differential indexes received from the second UE and a previous beamform configuration of the first UE.

In an embodiment, the one or more beam measurement reference signals corresponds to one or more differential indexes; and the beamform configuration for which the first UE is configured to transmit and receive FR2 SL transmissions is determined based on at least one differential indexes received from the second UE and a previous beamform configuration of the first UE.

Another example method involves receiving, by a second user equipment (UE), one or more beam measurement reference signals corresponding to one or more beamform configurations for transmitting frequency range 2 (FR2) sidelink (SL) transmissions to a first UE; generating, by the second UE, based at least in part on the one or more beam measurement reference signals received, beam-form candidate data corresponding to a preferred-candidate beamform configuration to transmit and receive FR2 SL transmissions with the first UE; and configuring the second UE to accept a beamform configuration based on the beam-form candidate data generated.

In an embodiment, the method further includes receiving, from the first UE, multiple repetitions of the one or more beamform configurations; and sweeping, by the second UE, the one or more beamform configuration received from the first UE to direct a receiving beam of the second UE.

An example system includes a second user equipment (UE) configured to generate beamform candidate data in response to receiving beam data corresponding to one or more beamform configurations; and a first UE configured to: determine one or more beam measurement reference signals corresponding to one or more beamform configurations for transmitting frequency range 2 (FR2) sidelink (SL) transmissions to the first UE, wherein a special slot within a regular resource pool comprises the one or more beam reference signals and the one or more beam measurement reference signals relate to one or more beamform configurations; and configure a beamform, based on beam-from candidate data received form the second UE, to transmit and receive FR2 SL transmissions with the second UE according to at least a beamform configuration of the one or more beamform configurations.

BRIEF DESCRIPTION OF THE DRAWINGS

In the following section, the aspects of the subject matter disclosed herein will be described with reference to exemplary embodiments illustrated in the figures, in which.

DETAILED DESCRIPTION

Figure 1:
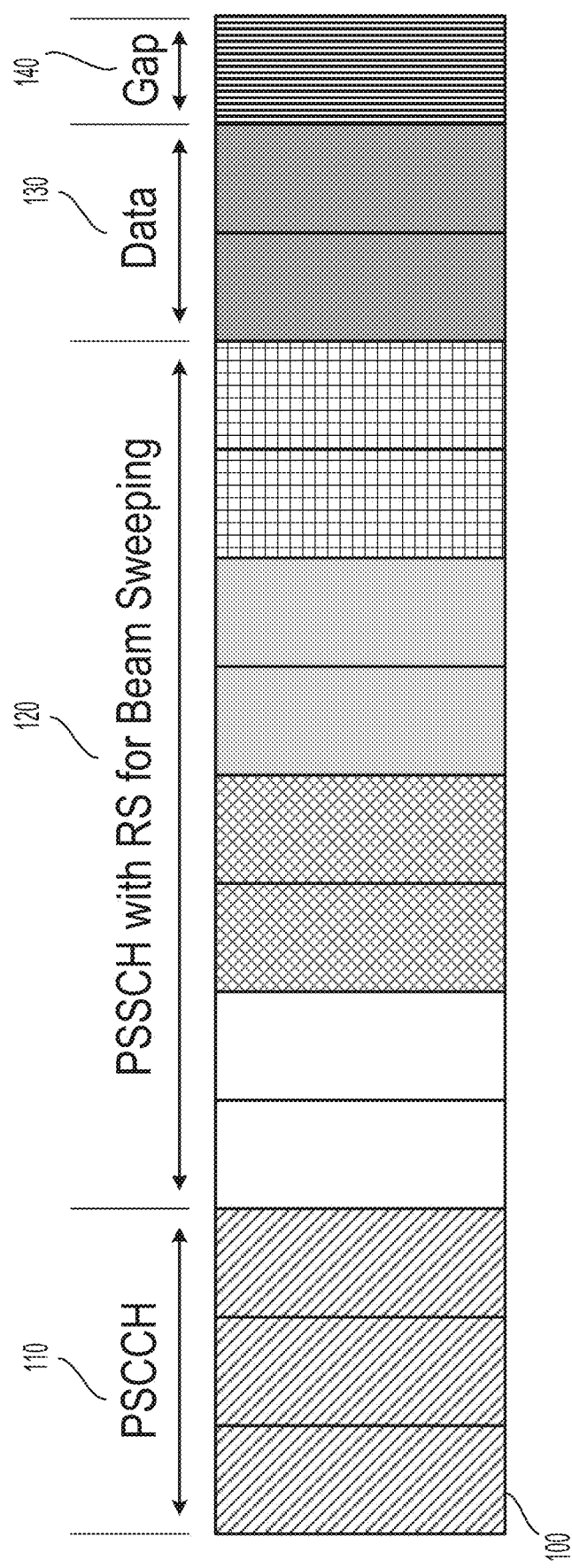
FIG. 1 is a diagram illustrating a resource block slot configuration for FR2 SL communications according to various embodiments.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it may be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

As described herein, methods and systems for improved FR2 sidelink communications will resolve issues with FR2 beamforming by providing a paradigm whereby transmitting and receiving UEs will more quickly, reliably, and efficiently communicate with each other, improving sidelink operations between interconnected objected. Various types of improvements to the FR2 beamforming processes include changes to data exchange structure, format, type, and others that will be described below.

Improved Slot Structure for Beam Sweeping

A key component of beam tracking is the ability of the transmitting UE to perform transmit beam sweeping. Transmit beam sweeping helps to identify the best-option beam for communication between two UEs. The UE may switch to the best-option beam for sending and receiving data when a different current active beam if signals to no longer be a best-option beam (i.e., a metric, such as beam strength, drops below a certain threshold). In this case, the transmitting UE will send multiple reference signals outwards, each of which points towards a specific transmit beam direction. Factoring into the transmission is the delay incurred by the transmit beam sweeping, especially if the transmit beams are sent in a TDMed fashion over multiple slots, and the resource blocks (RBs) over which these beams are sent since all Mode 2 based SL transmissions are opportunistic.

To reduce the delay incurred, and thus improve FR2 beamforming, a special resource configuration may be used.

In some embodiments, this special resource configuration may include a special slot within a regular resource pool, a subset of sub channels within a slot or a regular resource pool, or a special resource pool for beam sweeping. In this special slot, multiple reference signals are sent either in consecutive or non-consecutive orthogonal frequency division multiplexing (OFDM) symbols whereby the reference signals within each (one or subset) of symbols are sent in a different transmit beam directions.

Subsequently, the receiving UE side may perform signal to interference plus noise ratio SINR measurements over these reference signals and accordingly identify whether a current beam in operation offers the best-option link quality or not, and in the latter case, whether there is a best-option beam, and if the UE may to switch to that best-option beam. In some embodiments, the resource pool comprises several sub channels and several time slots.

The number of consecutive or non-consecutive OFDM symbols over which the reference signals (RS) signals are sent before switching to the subsequent beams and the number of beams that may be swept in a given slot may be configured per resource pool and may be dependent on priority. For example, one possible configuration embodiment provides that in a given slot, beams may be swept whereby the reference signals of each beam are sent over two consecutive OFDM symbols. This example is depicted in FIG. 1.

FIG. 1 is a diagram illustrating a resource block slot configuration for FR2 SL communications according to various embodiments. More specifically FIG. 1 depicts an example slot configuration of RBs 100. The RBs are lined up sequentially and further designated based on a configuration that may be known to both transmitting and receiving UEs are part of FR2 SL operations. For example, FIG. 1 depicts three blocks dedicated to a PSCCH span 110 at the beginning of the configuration. Such RBs will therefore carry information related to control signaling such as resource reservations (i.e., time, frequency, period) and/or additional information to be able to decode the received data/additional control information. In some cases it may also include details on beam sweeping and reference signals according to embodiments described herein. A next span is a beam sweeping span 120 including eight blocks with information dedicated to PSSCH with RS information to be used in beam sweeping operations. A UE receiving information at these RBs may use that information to perform beam spanning according to the embodiments described herein.

The next span is a data span 130 for carrying general data that is the underlying purpose of the SL exchanges between two UEs. For example, the data span 130 may contain information about the relative location, speed, and heading of a first UE as part of a SL-enabled platoon that other UEs may use to track the first UE in real time. The final span is a gap span (140) that is used to allow for operation of switching between transmitting and receiving. For example, a UE transmitting for a data span may have enough time to switch to receiving mode and receive a control part in the following slot. In some cases, the gap span also allows for receive/transmitting switching (i.e. if a UE was receiving signals, then the UE can switch to transmitting mode and start transmitting PSCCH information at the following slot boundary. In some embodiments not depicted in FIG. 1, one or more symbols after the PSCCH may be used for transmitting the second stage sidelink control information (SCI).

Due to the receiving UE recognizing the format of the special resource configuration, it may be configured to perform the measurements over all the transmitted beams and accordingly identify a transmit beam index that may offer the best-option link quality. The location (i.e., the starting symbol and starting RB) of the first reference signal within the special slot may also be configured per resource pool. Furthermore, the intensity of the reference signals within a symbol (i.e., the number of RBs occupied by the Reference signals and the number of resource elements (REs) per RB occupied by the reference signals) may also be configured per resource pool. Additionally, the REs not occupied by the RS may be used to send a payload to the receiving UE.

In various embodiments, the special slot may be configured to be periodic with a specific duration to further simplify the process and eliminate the need for special slot indication. For example, when FR2 is used in sidelink operations, the fifth transmission is typically a special slot for beam sweeping. This period may be configured per resource pool as a single value or may be dependent on priority or relative speed. For example, for higher priority traffic, the period may be decreased so that beam sweeping may be done more frequently to maintain the link quality. In some embodiments, the beam sweeping performed may also be optimized according to the relative speed between the transmitting and receiving UEs to compensate for low speeds when the link quality will not change very fast. For instance, if a transmitting UE and a receiving UE are somewhat constant in relative geographical proximity (i.e. even if both are moving in the same direction at high speed), the frequency of beam sweeping procedures may be reduced to save power and resources.

In addition the transmitting UE may also indicate the presence of the special slot to the receiving UEs. In some embodiments, a transmitting UE might be further required to send a periodic reservation to the receiving UE. In this reservation, an additional flag may also be included in the SCI to indicate the presence of a special slot. Alternatively, the transmitting UE may also send the special slot aperiodically by reserving a future slot and including a flag in the SCI to indicate the presence of a special slot.

In some embodiments, a special slot may be configured to be either heavily or fully loaded with reference signals or used for beam sweeping. In some embodiments, the number of beams swept within the special slot may be configured per resource pool and be dependent on the priority. In some embodiments, the number of beams swept within the special slot may be configured per resource pool and be dependent on the priority.

In some embodiments, to reduce the signaling overhead, the special slots may be periodic whereby the periodicity may be dependent on the priority or the relative speed between the transmitting and receiving UEs. In some embodiments, the special slots may also be sent aperiodically with an indication in the SCI of their presence.

To perform sweeping according to the embodiments described herein, the receiving UE may be aware of the presence of any extra reference signals in order to decode them correctly. This is important when the special slots are not transmitted periodically and may be achieved by PHY signaling dynamically either in the 1st or 2nd stage SCI or semi-persistent as a MAC CE. In embodiments involving PHY signaling, a new field may be added to the 1st or 2nd stage SCI to indicate the presence of a special slot with a larger number of reference signal. Alternatively, one or more fields of the 1st or 2nd SCI may be set to reserved values to implicitly indicate the presence of the special slot.

Alternatively, MAC CEs may also be used to indicate that a future reservation by the transmitting UE will be used for beam sweeping so that the receiving UE is aware and ready to receive the special slot. The MAC CE may also include a periodicity. For example, it may also indicate that every forth transmission is a special slot. The future indication may also be used in case of PHY signaling (e.g., the next resource reservation indicated by the SCI may consist of a special slot for beam sweeping).

To complete the sweeping across all beams, it may be necessary to have multiple special slots that are non-consecutive. For example, if the transmitting UE in expected to sweep 16 beams, but a configuration holds that only 4 beams may be swept per special slot, then four special slots that are not necessarily consecutive may be needed for consistent function (i.e., there exists a super cycle to complete all the sweeping necessary). In some embodiments, a resource pool configuration is used to decide whether these slots are to be consecutive or not.

Figure 2:
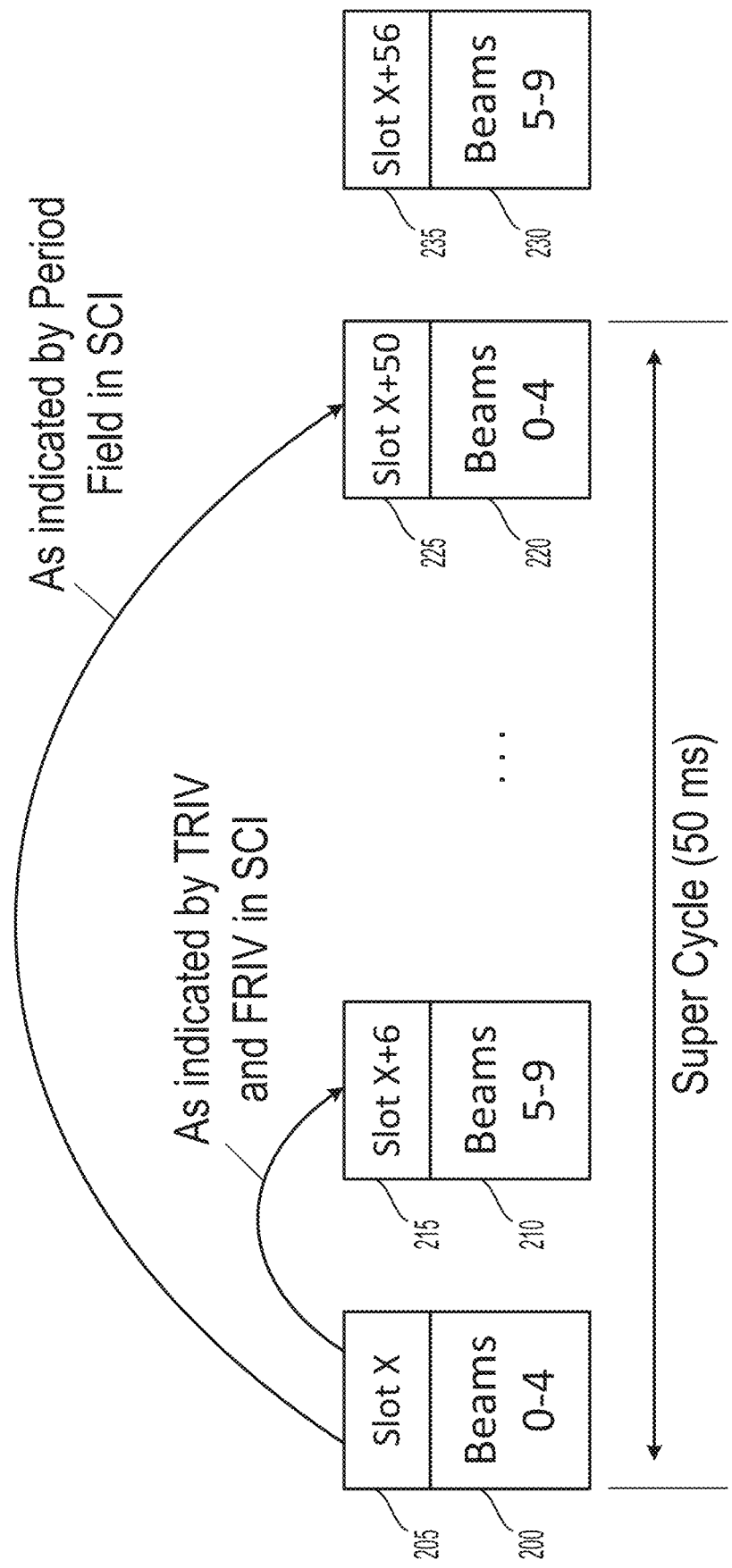
FIG. 2 is a diagram illustrating a distribution of slots among beams during a super cycle period according to various embodiments.

Alternatively, the reservation of these special slots may be performed by each UE such that the UE performs future reservations for multiple special slots (e.g., by using the TRIV and FRIV along with the period) and within each slot it sweeps across a subset of the available indices. For example, as depicted in FIG. 2, a UE may reserve two slots for beam sweeping and perform a super cycle with a certain periodicity in a system with slot duration of a smaller periodicity. As described above, an additional field may be utilized to differentiate between regular and special slots in the SCI. FIG. 2.

FIG. 2 is a diagram illustrating a distribution of slots among beams during a super cycle period according to various embodiments. Specifically, FIG. 2 illustrates one process for how a UE may reserve 2 slots for beam sweeping and perform a super cycle with periodicity 50 ms in a system with slot duration of 1 ms. As depicted in FIG. 2, beams 200 correspond to slot 205 at the beginning of the supercycle. This correspondence may be associated to corresponding beams 210 and slot 215 later in the super cycle according to some indication provided in TRIV and/or FRIV in the SCI.

Corresponding beams 200 and slot 205 at the beginning of the supercycle may also be associated with corresponding beams 200 and slot 225 at the end of the supercycle according to an indicated in the period field in SCI. Corresponding beams 210 and slot 235 are not associated with other corresponding pairs due to the slots presence outside the super cycle period. In some embodiments not depicted in FIG. 2, an additional field might be needed to differentiate between regular and special slots in the SCI.

In various embodiments, the number of beam indices and the starting beam index of the first beam that will be transmitted in a special slot may be indicated by the transmitting UE using the 1st or 2nd stage SCI and/or by MAC CEs. Alternatively, the number of beam indices and the starting beam index of the first beam that will be transmitted in a special slot may be configured per resource pool.

In some embodiments, the Transmitting UE may be expected to signal the presence of a special slot to the Receiving UE so that it may perform the transmit beam sweeping. In some embodiments, the indication of a special slot may be carried either (explicitly or implicitly) in the 1st or 2nd stage SCI or as a MAC CE. In some embodiments, the indication of a special slot may be carried either (explicitly or implicitly) in the 1st or 2nd stage SCI or as a MAC CE.

In some embodiments, the indication of a special slot may be carried either (explicitly or implicitly) in the 1st or 2nd stage SCI or as a MAC CE. In some embodiments, the indication of a special slot may be done earlier than the special slot itself when a MAC CE is used as a container and also in cases wherein the 1st and 2nd stage SCIs are used as containers. In some embodiments, a transmitting UE might need to use multiple special slots to complete the sweeping across all the required beam indices.

In some embodiments, the set of special slots needed to sweep across all beams (i.e., the super cycle of special slots) may be either consecutive (e.g., by resource pool configuration) or it may be opportunistically reserved by SCIs by the Transmitting UE. In some embodiments, in case of opportunistically reserved resources by the Transmitting UE to transmit the set of special slots (i.e., to complete the super cycle of special slots), the Transmitting UE might need to indicate the starting beam index and the number of indices to be swept in each slot either in 1st or 2nd stage SCI or as a MAC CE. Alternatively, this may also be configured per resource pool.

In some embodiments, to achieve reliable beam sweeping by decreasing the chances of collisions between special slots and reservations by neighboring UEs, a future slot may be reserved. In particular, the reservation of a future special slot may be indicated to neighboring UEs to reduce the chances of collisions. In one example, a UE sends the SCI on the PSCCH with a wider beam whereby the reference signals (RS) sent in the special slot sweep multiple narrower beam indices that are Quasi Co-located (QCLed) with the sidelink control information (SCI). For example, the SCI may be sent with a wide beam (e.g., 120 degrees) whereas the special slot contains reference signals that sweep four narrower beams (e.g., 30 degrees each) that are QCLed with the SCI.

Figure 3:
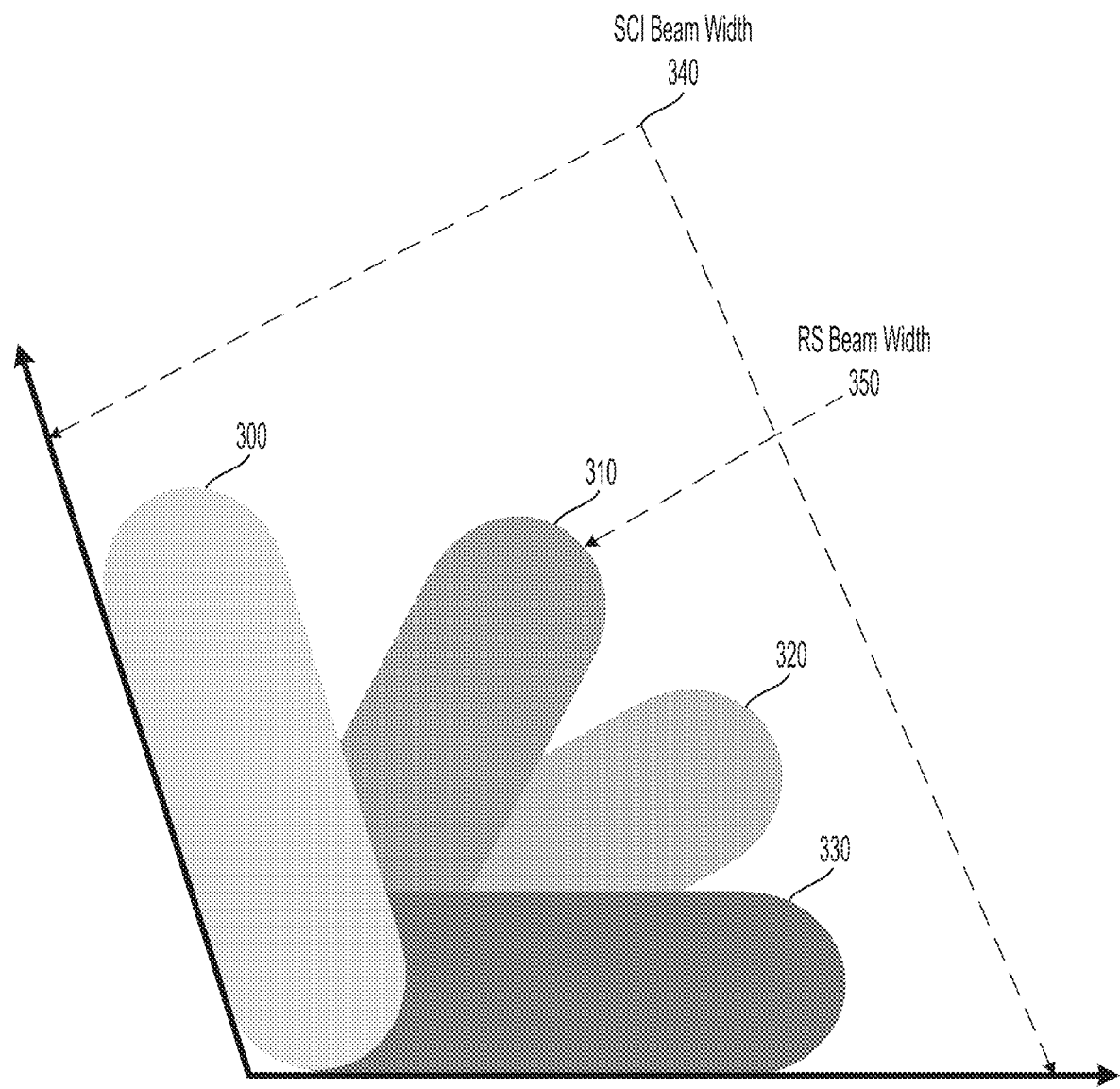
FIG. 3 is a diagram illustrating quasi co-location between sidelink control information and reference signals according to various embodiments.

FIG. 3 is a diagram illustrating quasi co-location between sidelink control information and reference signals according to various embodiments. Specifically, FIG. 3 depicts a measurement of SCI beam width and RS beam width according to a special slot configuration of beams. Each of beams 300-330 is shown according to their relative width and direction emanating from a single source. The SCI beam width 340 can be measured through each of the bounding axes for beam direction, as shown by the dotted line. The RS beam width 350 can be measured via the relative projection area of a particular beam, for example beam 310. Both of these measurements can be used to determine the QCL of the special slot figuration to aid in beam selection.

In embodiments such as those depicted in FIG. 3, using the wider beam for the SCI will ensure that neighboring UEs have access to the future reservations, thus reducing the chances of a neighboring UE transmitting within the special slot and interfering with the beam sweeping. Higher priority may be given to special slot reservations to reduce the chances of being pre-empted by neighboring UEs. In some embodiments, higher priority may be applicable only to the pre-emption procedure to avoid being pre-empted by neighboring UEs. However, for the case of resource reselection (i.e., reselecting a different resource in lieu of a resource reservation that was not signaled yet and was sensed as reserved by a neighboring UE) the priority may be reduced in order to increase the chances of triggering a resource reselection and avoiding collisions.

In some embodiments, to avoid collisions between special slot reservations and reservations done by neighboring UEs it is essential to transmit the SCI with a wider beam to ensure that the future reservation for the special slot is received by neighboring UEs. In some embodiments, the RS used for beam sweeping within the special slot are QCLed with that of the SCI and should cover narrower beams.

In some embodiments, the RS used for beam sweeping within the special slot are QCLed with that of the SCI and should cover narrower beams. In some embodiments, two priority levels may be associated with special slots such that 1) higher priority once the special slot is signaled to avoid being pre-empted by a neighboring UE and reduce the chances of the same resource being reused by a neighboring UE, and 2) a lower priority in case the future reservation for the special slot is not signaled yet to increase the chances of triggering a resource reselection and avoiding collisions with a neighboring UE's reservation.

Triggering for Beam Sweeping and its Containers

In embodiments utilizing a special slot, overhead associated therewith is reduced by sending the request from the receiving UE. For example, when the receiving UE detects that the signal quality of the currently used beam is deteriorating (e.g., the received reference signal received power RSRP drops below a threshold, the hypothetical block error rate BLER rises beyond a threshold, the signal to interference plus noise SINR deteriorates to low level, a lot of NACKs of consecutive received PSSCH, etc.), it may generate and/or send a request to the transmitting UE to send a special slot with the extra reference signals for the beam sweeping back to the receiving UE. This signaling request may be sent in the PSFCH or PSFCH-like resources (e.g., the resources allocated for inter-UE coordination using Scheme 2) to reduce the signaling overhead to implement it, as well as the latency, which is highly useful in sidelink operations.

In embodiments involving PSFCH-like resources, a specific offset (i.e., specific time/frequency/code resource) may be used to indicate the request for beam sweeping. Alternatively, in case of using the PSFCH, this may be done when feedback is not requested by the transmitting UE, thus yielding the PSFCH resources available for the indication (in this case the PSFCH resources may be configured per resource pool). Alternatively, the request for beam sweeping may also be sent in 1st or 2nd stage SCI either implicitly (i.e., by setting one or more fields to specific values) or explicitly (i.e., by adding a new field) or as a MAC CE and they may be sent either with or without data.

In some embodiments, the Receiving UE may request beam sweeping from the Transmitting UE when the detected RSRP of the current beam falls below a threshold or when the hypothetical BLER is above a threshold. In some embodiments, the request for beam sweeping may be carried either in PSFCH or PSFCH-like resources as UE assistance. In some embodiments, the request for beam sweeping may be carried either in PSFCH or PSFCH-like resources as UE assistance information.

In some embodiments, the request for beam sweeping may be carried either (explicitly or implicitly) in the 1st or 2nd stage SCI or as a MAC CE and may be sent even if no data is available for transmission. The transmission of the beam sweeping slot may also be triggered by specific conditions from the Transmitting UE side. For example, if feedback is enabled and the Transmitting UE receives a number of consecutive NACKs it may trigger a beam sweeping slot to the Receiving UE. The number of consecutive NACKs may be configured per resource pool. Similarly, when the Receiving UE sends a specific number of consecutive NACKs to the Transmitting UE, it may expect that a sweeping slot will be transmitted and accordingly perform the beam sweeping. The threshold on the number of received NACKs may also be defined as number of NACKs in a particular time window, and thus they might not necessarily be consecutive. The window length may be configured per resource pool.

In some embodiments, the request for beam sweeping may be carried either in PSFCH or PSFCH-like resources as UE assistance information. In some embodiments, the beam sweeping may be triggered by the Transmitting UE when specific conditions are met (e.g., after receiving a number of consecutive NACKs from the Receiving UE).

Beam Indices Feedback for Selection

In some embodiments, the receiving UE may be required to feed-back one or more beam indices to the transmitting UE for beam selection based on pre-configuration. To reduce the overhead associated with signaling the beam indices to the Transmitting UE, one possibility is to rely on differential indication. In particular, it is highly likely that the best beam will be adjacent to the current one. In this case, a UE may signal either to maintain the same beam or +1 beam index or −1 beam index. In addition, it may also indicate the following combinations using 2 bits according to the example table below:

| 00 | → | (current beam, +1 beam index) |
| 01 | → | (current beam, −1 beam index) |
| 10 | → | (+1 beam index, +2 beam index) |
| 11 | → | (−2 beam index, −1 beam index) |

The granularity used for the differential indication and the indices corresponding to each bit combination may be configured per resource pool. In addition, the UE might be configured to elect to send the beam measurements differentially as well. In particular, the UE may be configured to report the absolute measurements of the best beam and then report the measurements of remaining beams relative to the best one. For example, it may report the RSRP measurement of the best beam (e.g., 20 dB) and then report the RSRP level of the 2nd beam relative to the first one (e.g., −3 dB). In addition, a UE might elect to report the beam measurements in a discrete manner along with the beam index. For example, it may report the following states using 3 bits feedback according to the example table below:

| 000 | → | (beam index +1, High RSRP) |
| 001 | → | (beam index +1, Medium RSRP) |
| 010 | → | (beam index +1, Low RSRP) |
| 011 | → | (beam index −1, High RSRP) |
| 100 | → | (beam index −1, Medium RSRP) |
| 101 | → | (beam index −1, Low RSRP) |
| 110 | → | (Current beam index, High RSRP) |
| 111 | → | (Current beam index, Low RSRP) |

The table above illustrates one example of how high, medium, and low RSRP values may be configured per resource pool. In these embodiments, the transmitting UE may be configured to utilize the feedback in changing the transmitting beam to improve the link quality. In some embodiments, a UE might be required to skip reporting other beams if their link qualities are not good (e.g., if their measured RSRP value is below a threshold).

In some embodiments, to reduce the signaling overhead for beam index feedback, the Receiving UE may rely on differential signaling (e.g., +1 over the current beam index). In some embodiments, to reduce the signaling overhead for beam measurement feedback, the Receiving UE may report the absolute measurement of the best beam only and then report the measurements of remaining beams relative to the first one. In some embodiments, to reduce the signaling overhead, the Receiving UE may provide the differential beam index along with a discrete estimate of the associated measurement to the Transmitting UE to update the beam selection. In some embodiments, a UE might skip reporting of secondary beam indices and their measurements (i.e., beams indices other than the best one) if their RSRP is below a certain threshold.

Another approach to reduce the signaling overhead for beam indices involves adjusting the beam width dynamically. This solution is useful is cases where the relative mobility between the transmitting and receiving UEs is high and not enough sweeping is performed. In these embodiments, the receiving UE may request an increase in the beam width in order to maintain the link quality while reducing the need for frequent sweeping and feedback. Alternatively, when the mobility is low, the receiving UE may request the transmitting UE to further reduce the beam width in order to improve the link quality. The triggering of the adjustment request and the amount of change in the beam width may be based on priority and the detected relative mobility between the transmitting and receiving UEs. In addition, the selection of the beam width may be done from a set of pre-configured values per resource pool.

In some embodiments, the receiving UE might request an adjustment to the beam width to either reduce the need for frequent beam sweeping and feedback (i.e., by using a wider beam) or to improve the link quality (i.e., by using a narrower beam). In some embodiments, the triggering of the adjustment request and the amount of change in the beam width may be based on priority and the detected relative mobility between the transmitting and receiving UEs. The beam width adjustment may be done from a preconfigured set of values per resource pool.

In some embodiments, a container to carry beam indices and corresponding measurements feedback to the transmitting UE may be dependent on the payload size. For instance, if only a differential beam index reporting is sent to the transmitting UE, it might be done using the PSFCH or PSFCH-like resources (i.e., using inter-UE coordination scheme 2 of Rel-17). Alternatively, if actual index reporting applies (i.e., non-differential), it may be sent using PHY layer signaling (i.e., the 1st or the 2nd stage SCI) or as a MAC CE. In situations where the beam indices are being carried in 2nd stage SCI, is may be done by introducing a new 2nd stage SCI format. This new format may be signaled by the 1st stage SCI and the number of beams/measurements carried in the 2nd stage SCI may be configured per resource pool. In case of using MAC CE, either an individual MAC CE may be used to carry each beam along with its measurements if available or 2 MAC CEs may be introduced whereby one carries the beam index and the other carries the related beam measurements. The choice between the containers to use may be made according to resource pools and may be dependent on priority.

In some embodiments, the beam indices feedback may be carried using 1st stage or 2nd stage SCI or MAC CE or PSFCH-like resources used for Scheme 2 feedback. In some embodiments, the container to carry the beam indices feedback may be pre-configured per resource pool based on priority or payload size (e.g., PSFCH-like in case of differential feedback and 2nd stage SCI in case of multiple indices feedback).

Location of Special Slot in the Frequency Domain

It is highly preferential for the receiving UE to have access to the location of the sub channels carrying a special slot. Performing normal processing and special slot processing on each sub-channel may sometimes not be optimal due to processing power restriction. In these cases, it is possible to specify the exact location of the sub-channel(s) occupied by the special slot to the receiving UE along with the timing indication. For example, a transmitting UE may indicate that a future reservation will carry a special slot (e.g., by adding a new field in the 1st stage SCI, a new 2nd stage SCI format or a new 2nd stage SCI field or by setting one or more parameters to specific values). In such embodiments, the Frequency Resource Indicator (FRIV) included in the SCI may specify the starting subchannel that carries the special slot.

In addition, the number of sub channels (i.e., the L_subchannel field) for the special slot may be configured per resource pool and may be used to override the L_subchannel length indicated in the SCI. In some embodiments, the starting subchannel occupied by the special slot may be indicated using the FRIV in a previous reservation by the Transmitting UE. In this case, the reservation will also include either an implicit or explicit flag indicating that the next reservation is used for beam sweeping. In some embodiments, the number of sub channels occupied by the special slot may be pre-configured per resource pool and accordingly override the L_subchannel value obtained through the FRIV.

In some embodiments, a special resource pool for sending the special slots is accessible. In particular, this resource pool contains a limited number of sub channels (e.g., one subchannel) that may be dedicated for sending special slots. In the time domain, the special resource pool may occur frequently in the time domain to reduce the latency (i.e., it occupies a large number of slots within a given duration). When this resource pool is configured, UEs may be restricted to sending their special slots for beam sweeping only in this resource pool. Having a special resource pool for special slots, full freedom can be given in dedicating all the symbols within the slot to beam sweeping. In addition, the chances of collisions with regular data transmissions of neighboring UEs is reduced.

In such embodiments, two options may be considered for the frame structure in this special resource pool. In a first option, in these special slots, the PSCCH may be removed and it may contain only reference signals for beam sweeping. In this case, the reservation may be done in other resource pools whereby the PSCCH in these resource pools may perform reservations in the special resource pool. In particular, by adding a specific flag to either the 1st or 2nd stage SCI or as a MAC CE in the PSCCH send in the regular resource pool, it may be used to indicate that future reservations (i.e., the resources indicated by the TRIV and FRIV) are referring to the special resource pool. For example, if the special slot consists only of one subchannel, only the TRIV may be considered to indicate which slot is reserved by the UE for sending its special slot. Note that in this case, the logical slot indicated by the TRIV will be based on the parameters of the special slot (i.e., the number of slots in the special resource pool). In addition, the PSFCH feedback may also be disabled in the special resource pool to have more resources for beam sweeping.

In a second option, in these special slots, a special PSCCH may be used whereby the parameters are designed specifically for the special slots. For example, the MCS and the 2nd stage SCI format fields in the 1st stage SCI may be removed. In addition, the 2nd stage SCI may be removed in order to use all the remaining symbols for transmitting the RSs. In addition, the PSFCH feedback will also be disabled in this resource pool to have more resources for beam sweeping. Finally, the 1st stage SCI may indicate the future reservation that will be used for sending the special slot by the transmitting UE.

In some embodiments, the transmission of special slots may be restricted to special resource pools to have better resource utilization and reduce the chances of collisions with neighboring UEs. In some embodiments, the transmissions within the special resource pool may have a different frame structure than regular transmissions. In various embodiments, the special slots sent in the special resource pool may be either sent without PSCCH or it may be sent with a reduced PSCCH and no 2nd stage SCI to allow for more symbols to be dedicated for beam sweeping.

In various embodiments, the reservations of special slots within the special resource pool may be either done with PSCCH transmissions within the special pool itself or it may be done by PSCCH transmissions sent in a different resource pool. In the latter case, a special flag may be needed in the 1st or 2nd stage SCI or a MAC CE to indicate the cross resource pool scheduling.

Transmission without PSCCH in FR2

In many cases, a UE is used to receive the PSCCH in order to perform sensing for resource selection and to receive the corresponding PSSCH. Although the PSCCH is highly protected (i.e., by using lower MCS level), it might not perform well with directivity. That is to say, if the beam is pointing to a direction different from that of the receiver, it might significantly deteriorate the signal quality, thus resulting in a non-decodable PSCCH. This drawback becomes more significant with high mobility when both the Transmitting UE and the Receiving UE are highly mobile.

In various embodiments, UEs rely on wider beam-widths for PSCCH when compared to the PSSCH to help with either PSSCH beam failure recovery or with PSSCH beam reselection. In these embodiments, even if the UEs move in their geographic position and/or relative to each other, they will still be have the ability to decode the PSCCH and accordingly attempt to decode the PSSCH and provide the feedback. In addition, the loss in the signal strength due to the wider beam may be accommodated by the lower MCS used by the PSCCH and thus its performance should only slightly deteriorate. The beamwidth used by the PSCCH may be either explicitly configured per resource pool or it may be configured relative to that of the PSSCH (e.g., 2 times larger than the PSSCH beamwidth) per resource pool.

In some embodiments, a UE is configured to transmit only the data part (the PSSCH) in FR2 while the control part (the PSCCH) is sent in FR1. In this case, the PSCCH may benefit from the better FR1 coverage while the data rate may be increased by using the higher bandwidth offered by FR2. Similar to the wider beam approach discussed above, this may also help with either PSSCH beam failure recovery or with PSSCH beam reselection. When using the FR2 assisted by FR1 approach, a mapping rule may be established to link the PSCCH with the associated PSSCH. For example, each FR1 subchannel may be associated with a specific subchannel in FR2 and accordingly the number of sub channels may be counted in FR2 as shown in FIG. 4.

Figure 4:
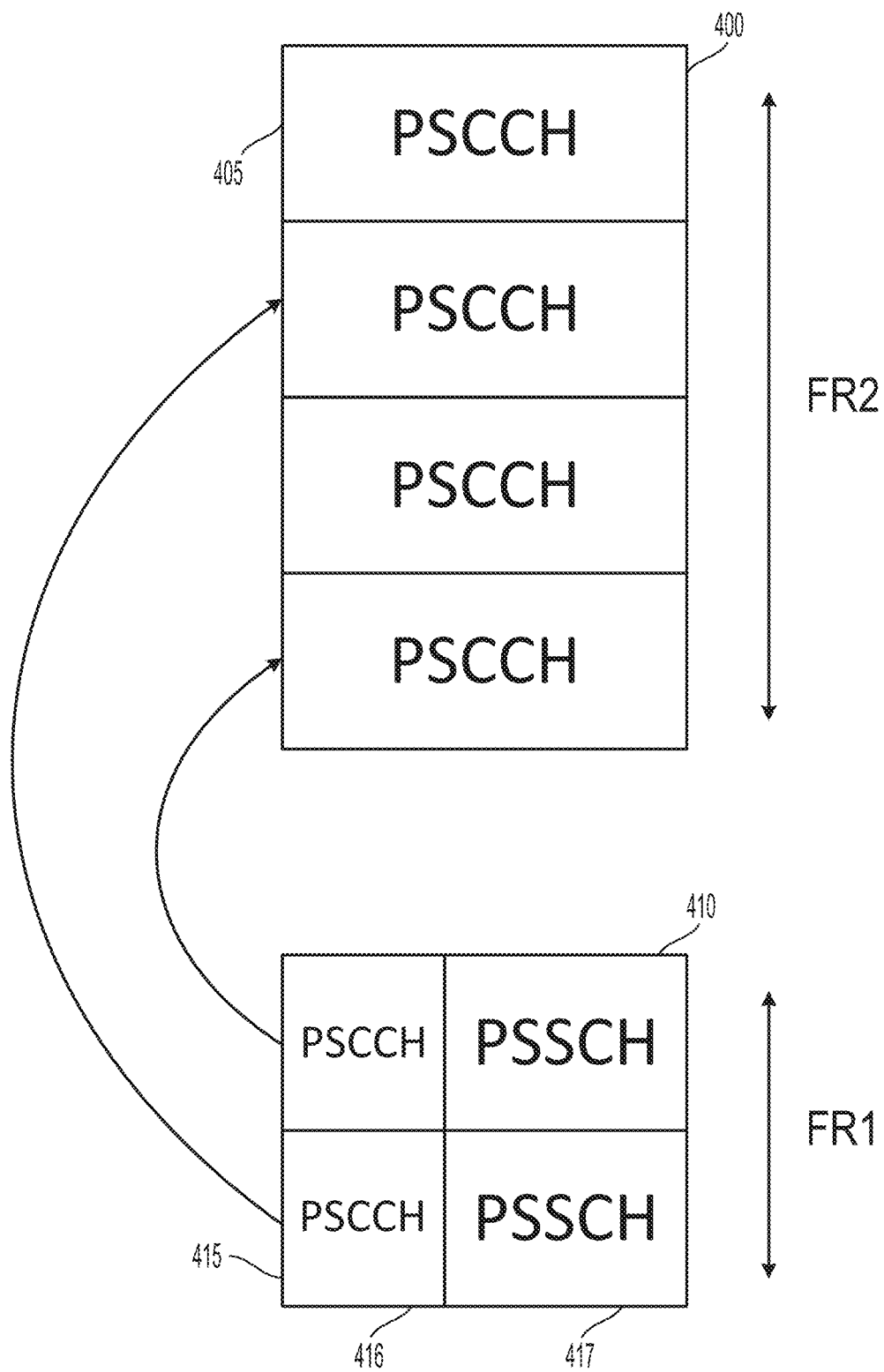
FIG. 4 is a diagram illustrating an association between a physical sidelink control channel in FR1 and a physical sidelink shared channel in FR2 according to various embodiments.

FIG. 4 is a diagram illustrating an association between a physical sidelink control channel in FR1 and a physical sidelink shared channel in FR2 according to various embodiments. More specifically, FIG. 4 illustrates the relationship between a set of blocks in FR1 and FR2 according to embodiments described herein. As depicted in FIG. 4 two sets of sub channels may be inter-associated, for example subchannel set 400 in FR2 and subchannel set 410 in FR1. Subchannel set 400 in FR2 is composed of multiple PSCCH sub channels 405 in sequential order. Subchannel set 410 in FR1 is composed of multiple hybrid sub channels 415 including both PSCCH information 416 and PSSCH information 417. Each subchannel 415 of subchannel set 410 may be associated through mapped with corresponding sub channels 410 in subchannel set 400. For example, FIG. depicts every consecutive subchannel 415 of subchannel set 410 with every 2nd subchannel 405 of subchannel set 400 via the PSCCH information 416 of the sub channels 415.

In one detailed example, a hypothetical FR1 has three (A, B, C) sub channels and a hypothetical FR2 has thirty (1-30) sub channels. In this example case, the three FR1 sub channels A, B, and C may be mapped to FR2 sub channels 1, 11, and 21, respectively. Furthermore, if a PSCCH in subchannel B indicates an L_subchannel field (i.e., number of occupied sub channels) equal to 5 then this means that the associated PSSCH occupies channels 11 to 15. Similarly, if a PSCCH in subchannel A indicates an L_subchannel field (i.e., number of occupied sub channels) equal to 15 then this means that the associated PSSCH occupies channels 1 to 15.

In the example above, the TB may also be sent in FR1 to utilize the PSSCH in the subchannel used to send the PSCCH. Alternatively, the PSCCH sent in FR1 may carry carrier ID, the subchannel index and the number of sub channels either in 1st or 2nd stage SCI or as a MAC CE carried in the PSSCH sent in the FR1. This gives the UE full freedom in selecting any number of sub channels for data transmission in FR2. In addition, it also helps if the FR2 sub channels are not contiguous (i.e., divided across multiple carriers) when carrier aggregation is adopted. For example, if two FR2 carriers exist each with 50 sub channels. Then a PSCCH transmission in FR1 may point to one specific carrier and a starting subchannel index in addition to specifying the number of occupied sub channels. For example, the FR1 PSCCH may carry the three values (1, 5, and 25) to indicate the 1st FR2 carrier, subchannel index 5 being the first subchannel and the number of occupied sub channels becomes 25.

In various embodiments, to achieve better coverage in high mobility scenarios, the PSCCH may be transmitted with a beamwidth larger than that used for the PSSCH transmission. In various embodiments, to achieve better coverage in high mobility scenarios, the PSCCH may be transmitted in FR1 whereas the corresponding PSSCH may be transmitted in FR2. In various embodiments, each PSCCH transmission in FR1 subchannel may be directly mapped to a specific subchannel in FR2, whereby the L_subchannel field sent in FR1 is used to identify the number of occupied sub channels in FR2. In various embodiments, to achieve a higher mapping flexibility, the PSCCH carried in FR1 may indicate the FR2 carrier index, the starting subchannel index and the number of subchannel. This information may be carried either in the 1st or 2nd stage SCI or as a MAC CE.

Redundant Beams Transmission

In some embodiments, a transmitting UE might be utilized to transmit multiple beams so that the Receiving UE(s) may switch between different beams and avoid having a radio link failure (RLF). To achieve this, the transmitting UE may transmit the multiple beams in one of several manners including, but not limited to: (1) a TDM manner (i.e., same data is sent across multiple beams in subsequent time slots) to preserve the Transmitting power at the expense of latency and throughput, 2) an FDM manner (i.e., same data is sent across multiple beams in consecutive sub channels) to reduce latency at the expense of throughput and transmit power, or 3) an SDM manner to (i.e., same data is sent across multiple beams through multiple antennas) to reduce latency and improve throughput at the expense of transmit power.

In such embodiments, the support of multiple UEs is enabled simultaneously (e.g., in the case of groupcast) when these UEs are not in the same direction with respect to the transmitting UE. Accordingly, when the transmitting UE transmits multiple beams, it is essential that it notifies the following receiving UEs on which beams are active (i.e., the active beams used by them and the ones used by other UEs within the groupcast).

This above embodiment is important for several reasons. First, the receiving UEs might require the transmitting UE to add beams to maintain coverage as the UEs continue to move in geographic space. Similarly, the receiving UEs might notify the transmitting UE to drop one or more beams from operation if they are not used in order to preserve power. Second, the receiving UEs might notify the transmitting UE of the need of beam sweeping if the list of active beams is not anticipated to be sufficient. This notification may be done for PSSCH beams (which may be narrower than PSCCH beams) or PSCCH beams since the link between the transmitting and receiving UE(s) is assumed to be still available. To notify the receiving UE(s), the transmitting UE may send a bitmap in either 1st stage or 2nd stage SCI or in a MAC CE.

In some additional embodiments, an indication may be included to specify whether these are PSCCH or PSSCH beams. In this bitmap, there may exist a 1-to-1 mapping between each bit and a corresponding beam index. In addition, to reduce the overhead, 1 bit may be mapped to multiple beams (e.g. setting the first bit may indicate that beams 0 and 1 are active whereas setting the second bit may indicate that beams 2 and 3 are active and so on). The association between the bitmap and the corresponding beam indices may be configured per resource pool once the indication of available beams is received by the receiving UE(s). The receiving UE may elect to switch to a different beam based on their measurements. This switching may be either done autonomously without notifying the transmitting UE or it may be done after notifying the transmitting UE of the intent of beam switching to allow it to disable the abandoned beams and subsequently save resources.

In some additional embodiments, the notification of the switch may also be done after the receiving UE have successfully performed the beam switch (e.g., within a given duration). The selection between these three options may be done based on resource pool configuration, for example. Finally, there may be a validity timer associated with the received beam indices that are indicated as active by the transmitting UE. This improves transmissions in cases wherein the transmitting UE is required to disable some beams in order to save resources. This timer may be reset by sending a beam maintenance request from the receiving UE to the transmitting UE.

In some embodiments, the Transmitting UE might be required to transmit multiple beams to offer reliable transmission to one or more UEs. These beams may be sent in either a TDM, FDM, or an SDM manner. In some embodiments, the Transmitting UE may use a bitmap to indicate the active beam indices to the Receiving UE(s) whereas the mapping between the active beams and the bits within the bitmap may be configured per resource pool. In some embodiments, the Transmitting UE may send the bitmap indicating the active beam indices either in the 1st or 2nd stage SCI or as a MAC CE.

In some embodiments, the indication of active beam indices by the Transmitting UE may be associated with a validity timer to enable the Transmitting UE to disable abandoned beams to save resources. In some embodiments, the switch between beams by the Receiving UEs may be done either autonomously (i.e., without notifying the Transmitting UE) or only after notifying the Transmitting UE based on resource pool configuration or the notification may come after the Receiving UE has completed the beam switching.

Directional Sensing at Receiving UE

In some embodiments, to achieve better directivity and higher SINR levels, the receiving UE may also use beamforming in order to experience a better gain in beam performance. To achieve this, a two-step sweeping step may be performed in which a first sweeping is used to identify favorable transmitting beam(s) and the second sweeping is used to identify favorable receiving beams(s). In some embodiments, this is achieved by updating the special slot structure mentioned above to include repetitions. In particular, in the special slot, reference signals used to measure a specific beam index may be repeated multiple times over consecutive or non-consecutive OFDM symbols. The number of these repetitions may be configured per resource pool.

Subsequently, the receiving UE may perform receive-beam-sweeping across these repetitions to identify the best receiving beam index for communication. For instance, there may exist two transmit beam indices that are considered at the transmitting side and three receive beam indices that are considered at the receiving side and the number of repetitions is set to "3". In this case, the Transmitting UE will send RSs in three consecutive OFDM symbols in the direction of the first transmit beam followed by another three consecutive OFDM symbols pointed towards the direction of the second transmit beam index. This will allow the receiving UE to operate to select the best receiving beam. Subsequently, the receiving UE may use this beam when reporting back the selected beam index to the Transmitting UE.

In some embodiments, to achieve better directivity gain, the receiving UE may sweep multiple receiving beams to identify the one with the best gain. In some embodiments, to facilitate the receiving beam sweeping, the transmitting UE may repeat the reference signals transmitted per each beam direction over consecutive or non-consecutive OFDM symbols within the special slot. The number of repetitions per beam direction may be configured per resource pool.

Enabling/Disabling of Beam Sweeping Feature

In embodiments where a large number of beam indices exist, then beam sweeping might need to be spread across multiple slots to avoid delays and losses of resources. These problems may be even more magnified in cases wherein both transmitting and receiving types sweeping is needed. In addition, transmitting might not be allowed on available resources until the sweeping is completed. Accordingly, the beam sweeping might not be possible for high priority traffic with stringent delay requirements (e.g., URLLC).

In such cases, the UEs may be capable of perform enabling or disabling of beam sweeping. This enabling/disabling function may be configured per resource pool. Furthermore, it may also be limited to certain priority. For example, UEs with priority higher than a threshold might be required to perform beam sweeping so that they may meet a stringent BER requirement, whereas low priority UEs might have more relaxed beam sweeping requirements to save power. Finally, the enabling/disabling of beam sweeping may also be indicated in the SCI as well. For example, a transmitting UE may indicate the presence or the cancellation of a periodic beam sweeping. This is specifically in cases wherein the transmitting UE doesn't have any more data to transmit and thus there is no need for beam sweeping.

In some embodiments, the beam sweeping feature may be enabled or disabled per resource pool per UE priority or by SCI indication.

Example Processes and Environments

Figure 5:
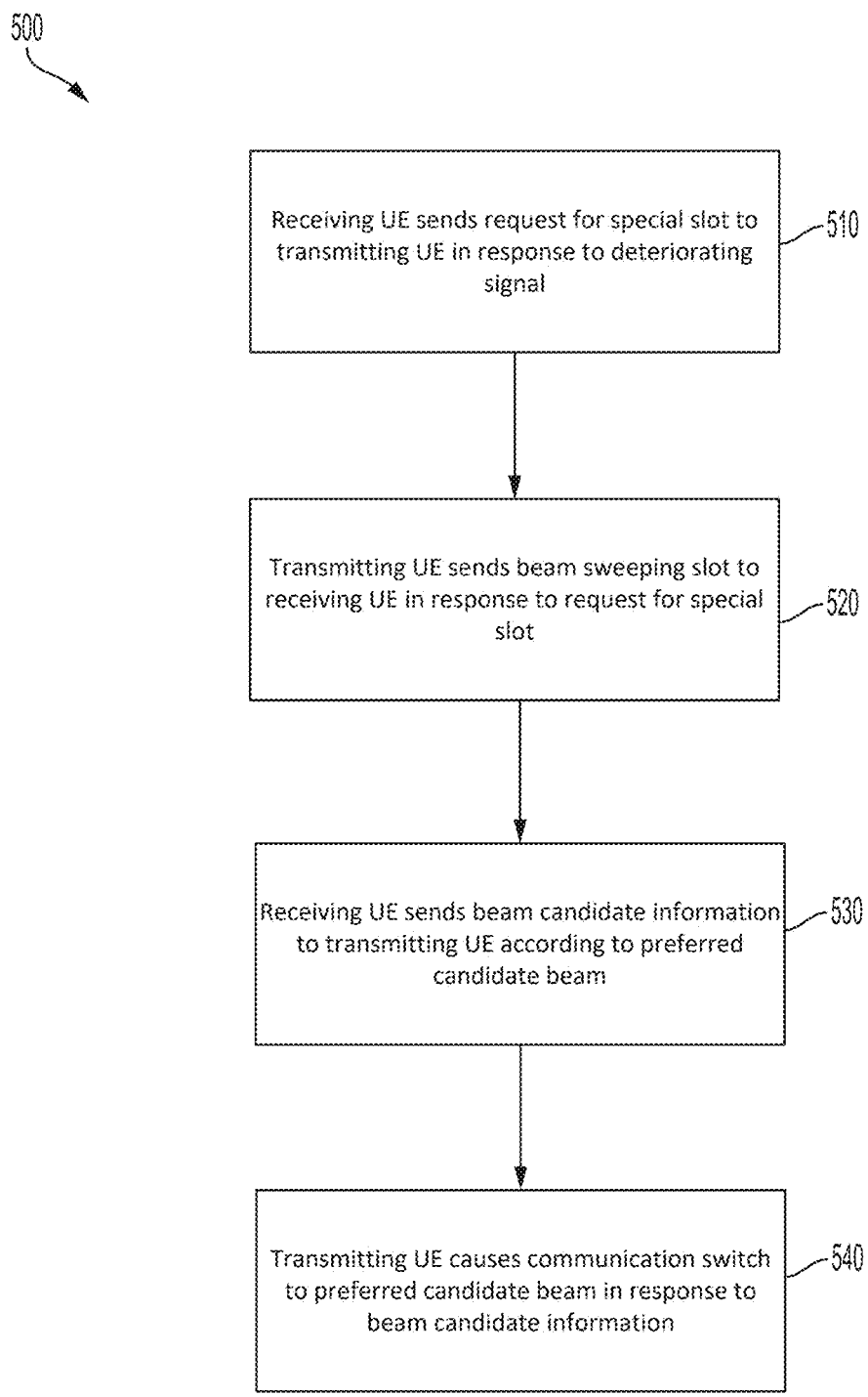
FIG. 5 is a diagram illustrating a process flow for FR2 SL beamforming and communication according to various embodiments.

FIG. 5 is a diagram illustrating a process flow for FR2 SL beamforming and communication according to various embodiments. FIG. 5 depicts process 500 for switching between beams for a receiving and transmitting UE in response to a deteriorating signal.

At step 510 of process 500, the receiving UE sends a request for special slot to the transmitting UE in response to deteriorating signal. For example, in response to a signal deterioration measured by the receiving UE (e.g., a third party object between the two UEs and blocking the current beam), the receiving UE may generate a request for a special slot to being a beam change procedure in FR2 SL and send that request to the transmitting UE over the current beam.

At step 520 of process 500, in response to receiving the request for the special slot, the transmitting UE may responsively send beam sweeping slot information to the receiving UE so that the receiving UE may determine a best candidate for beam switching.

At step 530 of process 500, the receiving UE utilizes the beam sweeping slot from the transmitting UE to generate best beam candidate information corresponding to a preferred beam candidate for continuing FR2 SL communication and sends that information to the transmitting UE. The preferred candidate according to the receiving UE may be the current beam or may be a different beam.

At step 540 of process 500, the transmitting UE, in response to receiving the preferred beam candidate information from the receiving UE, initiates a communication switch between the UEs to a preferred candidate beam. The preferred candidate beam will be the beam through which the UEs will continue to interact upon. In situations where the current beam is the preferred candidate beam, the transmitting UE may either continue the communication without switching beams, or may reconfigure the current beam to attempt to improve connection between the UEs (i.e., a "refresh" of the beam to improve operation).

Figure 6:
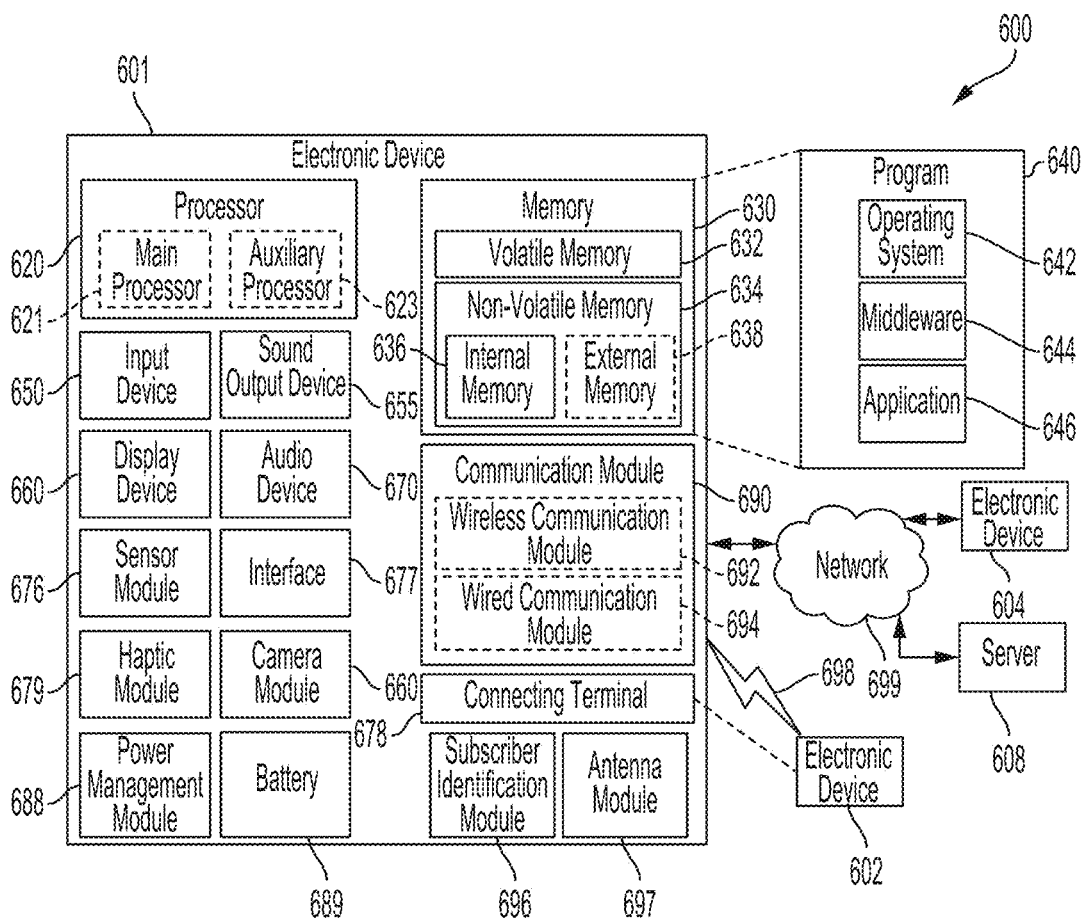
FIG. 6 is a block diagram of an electronic device in a network environment, according to various embodiments.

FIG. 6 is a block diagram of an electronic device in a network environment 600, according to an embodiment. The electronic device of FIG. 6 may comprise the receiving UE or transmitting UE performing the functions and embodiments described herein, such as those illustrated in FIGS. 1-5.

Referring to FIG. 6, an electronic device 601 in a network environment 600 may communicate with an electronic device 602 via a first network 698 (e.g., a short-range wireless communication network), or an electronic device 604 or a server 608 via a second network 699 (e.g., a long-range wireless communication network). The electronic device 601 may communicate with the electronic device 604 via the server 608. The electronic device 601 may include a processor 620, a memory 630, an input device 640, a sound output device 655, a display device 660, an audio module 670, a sensor module 676, an interface 677, a haptic module 679, a camera module 680, a power management module 688, a battery 689, a communication module 690, a subscriber identification module (SIM) card 696, or an antenna module 694. In one embodiment, at least one (e.g., the display device 660 or the camera module 680) of the components may be omitted from the electronic device 601, or one or more other components may be added to the electronic device 601. Some of the components may be implemented as a single integrated circuit (IC). For example, the sensor module 676 (e.g., a fingerprint sensor, an iris sensor, or an illuminance sensor) may be embedded in the display device 660 (e.g., a display).

The processor 620 may execute software (e.g., a program 640) to control at least one other component (e.g., a hardware or a software component) of the electronic device 601 coupled with the processor 620 and may perform various data processing or computations.

As at least part of the data processing or computations, the processor 620 may load a command or data received from another component (e.g., the sensor module 646 or the communication module 690) in volatile memory 632, process the command or the data stored in the volatile memory 632, and store resulting data in non-volatile memory 634. The processor 620 may include a main processor 621 (e.g., a central processing unit (CPU) or an application processor (AP)), and an auxiliary processor 623 (e.g., a graphics processing unit (GPU), an image signal processor (ISP), a sensor hub processor, or a communication processor (CP)) that is operable independently from, or in conjunction with, the main processor 621. Additionally or alternatively, the auxiliary processor 623 may be adapted to consume less power than the main processor 621, or execute a particular function. The auxiliary processor 623 may be implemented as being separate from, or a part of, the main processor 621.

The auxiliary processor 623 may control at least some of the functions or states related to at least one component (e.g., the display device 660, the sensor module 676, or the communication module 690) among the components of the electronic device 601, instead of the main processor 621 while the main processor 621 is in an inactive (e.g., sleep) state, or together with the main processor 621 while the main processor 621 is in an active state (e.g., executing an application). The auxiliary processor 623 (e.g., an image signal processor or a communication processor) may be implemented as part of another component (e.g., the camera module 680 or the communication module 690) functionally related to the auxiliary processor 623.

The memory 630 may store various data used by at least one component (e.g., the processor 620 or the sensor module 676) of the electronic device 601. The various data may include, for example, software (e.g., the program 640) and input data or output data for a command related thereto. The memory 630 may include the volatile memory 632 or the non-volatile memory 634.

The program 640 may be stored in the memory 630 as software, and may include, for example, an operating system (OS) 642, middleware 644, or an application 646.

The input device 650 may receive a command or data to be used by another component (e.g., the processor 620) of the electronic device 601, from the outside (e.g., a user) of the electronic device 601. The input device 650 may include, for example, a microphone, a mouse, or a keyboard.

The sound output device 655 may output sound signals to the outside of the electronic device 601. The sound output device 655 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 660 may visually provide information to the outside (e.g., a user) of the electronic device 601. The display device 660 may include, for example, a display, a hologram device, or a projector and control circuitry to control a corresponding one of the display, hologram device, and projector. The display device 660 may include touch circuitry adapted to detect a touch, or sensor circuitry (e.g., a pressure sensor) adapted to measure the intensity of force incurred by the touch.

The audio module 670 may convert a sound into an electrical signal and vice versa. The audio module 670 may obtain the sound via the input device 650 or output the sound via the sound output device 655 or a headphone of an external electronic device 602 directly (e.g., wired) or wirelessly coupled with the electronic device 601.

The sensor module 676 may detect an operational state (e.g., power or temperature) of the electronic device 601 or an environmental state (e.g., a state of a user) external to the electronic device 601, and then generate an electrical signal or data value corresponding to the detected state. The sensor module 676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 677 may support one or more specified protocols to be used for the electronic device 601 to be coupled with the external electronic device 602 directly (e.g., wired) or wirelessly. The interface 677 may include, for example, a high-definition multimedia interface (HDMI), a universal serial bus (USB) interface, a secure digital (SD) card interface, or an audio interface.

A connecting terminal 678 may include a connector via which the electronic device 601 may be physically connected with the external electronic device 602. The connecting terminal 678 may include, for example, an HDMI connector, a USB connector, an SD card connector, or an audio connector (e.g., a headphone connector).

The haptic module 679 may convert an electrical signal into a mechanical stimulus (e.g., a vibration or a movement) or an electrical stimulus which may be recognized by a user via tactile sensation or kinesthetic sensation. The haptic module 679 may include, for example, a motor, a piezoelectric element, or an electrical stimulator.

The camera module 680 may capture a still image or moving images. The camera module 680 may include one or more lenses, image sensors, image signal processors, or flashes. The power management module 688 may manage power supplied to the electronic device 601. The power management module 688 may be implemented as at least part of, for example, a power management integrated circuit (PMIC).

The battery 689 may supply power to at least one component of the electronic device 601. The battery 689 may include, for example, a primary cell which is not rechargeable, a secondary cell which is rechargeable, or a fuel cell.

The communication module 690 may support establishing a direct (e.g., wired) communication channel or a wireless communication channel between the electronic device 601 and the external electronic device (e.g., the electronic device 602, the electronic device 604, or the server 608) and performing communication via the established communication channel. The communication module 690 may include one or more communication processors that are operable independently from the processor 620 (e.g., the AP) and supports a direct (e.g., wired) communication or a wireless communication. The communication module 690 may include a wireless communication module 692 (e.g., a cellular communication module, a short-range wireless communication module, or a global navigation satellite system (GNSS) communication module) or a wired communication module 694 (e.g., a local area network (LAN) communication module or a power line communication (PLC) module). A corresponding one of these communication modules may communicate with the external electronic device via the first network 698 (e.g., a short-range communication network, such as Bluetooth™ wireless-fidelity (Wi-Fi) direct, or a standard of the Infrared Data Association (IrDA)) or the second network 699 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 692 may identify and authenticate the electronic device 601 in a communication network, such as the first network 698 or the second network 699, using subscriber information (e.g., international mobile subscriber identity (IMSI)) stored in the subscriber identification module 696.

The antenna module 697 may transmit or receive a signal or power to or from the outside (e.g., the external electronic device) of the electronic device 601. The antenna module 697 may include one or more antennas, and, therefrom, at least one antenna appropriate for a communication scheme used in the communication network, such as the first network 698 or the second network 699, may be selected, for example, by the communication module 690 (e.g., the wireless communication module 692). The signal or the power may then be transmitted or received between the communication module 690 and the external electronic device via the selected at least one antenna.

Commands or data may be transmitted or received between the electronic device 601 and the external electronic device 604 via the server 608 coupled with the second network 699. Each of the electronic devices 602 and 604 may be a device of a same type as, or a different type, from the electronic device 601. All or some of operations to be executed at the electronic device 601 may be executed at one or more of the external electronic devices 602, 604, or 608. For example, if the electronic device 601 should perform a function or a service automatically, or in response to a request from a user or another device, the electronic device 601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 601. The electronic device 601 may provide the outcome, with or without further processing of the outcome, as at least part of a reply to the request. To that end, a cloud computing, distributed computing, or client-server computing technology may be used, for example.

Figure 7:
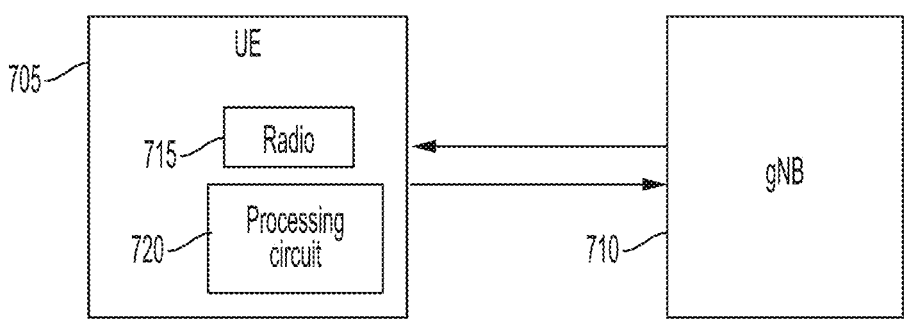
FIG. 7 is a block diagram of a system including a UE and a gNB in communication with each other according to various embodiments.

FIG. 7 shows a system including a UE 705 and a gNB 710, in communication with each other. The UE may include a radio 715 and a processing circuit (or a means for processing) 720, which may perform various methods disclosed herein. For example, the processing circuit 720 may receive, via the radio 715, transmissions from the network node (gNB) 710, and the processing circuit 720 may transmit, via the radio 715, signals to the gNB 710.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions may be encoded on an artificially-generated propagated signal, e.g., a machine-generated electrical, optical, or electromagnetic signal, which is generated to encode information for transmission to suitable receiver apparatus for execution by a data processing apparatus. A computer-storage medium may be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium may also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method comprising:
    determining, by a first user equipment (UE), one or more beam measurement reference signals corresponding to one or more beamform configurations for transmitting frequency range 2 (FR2) sidelink (SL) transmissions to a second UE,
    wherein a special slot within a regular resource pool comprises the one or more beam measurement reference signals and the one or more beam measurement reference signals relate to the one or more beamform configurations; and
    configuring the first UE, based at least in part on the one or more beam measurement reference signals, to transmit and receive FR2 SL transmissions with the second UE according to at least a beamform configuration of the one or more beamform configurations,
    wherein configuring the first UE to transmit and receive FR2 SL transmissions according to the beamform configuration is further based on a decoding of a bit-signal received from the second UE.

2. The method of claim 1, wherein the one or more beam measurement reference signals are previously received from the second UE and the beamform configuration of the one or more beamform configurations is a preferred-candidate beamform configuration as determined from the one or more beam measurement reference signals.

3. The method of claim 2, wherein the decoding of the bit-signal received from the second UE is based on a predetermined coding paradigm.

4. The method of claim 1, further comprising:
    maintaining a configuration of the first UE corresponding to a previous beamform configuration of the one or more beamform configurations; and
    determining, based at least on one or more signals received from the second UE, that the previous beamform configuration of the one or more beamform configurations is deteriorating.

5. The method of claim 4, wherein:
    the one or more beam measurement reference signals are generated in response to the determination that the previous beamform configuration is deteriorating;
    the one or more beam measurement reference signals are sent from the first UE to the second UE; and
    configuring the first UE to transmit and receive FR2 SL transmissions according to the beamform configuration is further based at least in part on a beamform sweeping signal received from the second UE after the second UE has collected measurement data.

6. The method of claim 1, wherein a format of the special slot is configurable per resource pool and is dependent on a priority.

7. The method of claim 1, wherein the one or more beam measurement reference signals include a PHY signaling field indicating the presence of the beam sweeping information in the special slot.

8. The method of claim 1, further comprising:
    sending, by the first UE, the special slot comprising the one or more beam measurement reference signals to the second UE; and
    receiving, from the second UE, a signal corresponding to a beam sweeping performed with beam sweeping information, wherein configuring the first UE to transmit and receive FR2 SL transmissions is based on the signal corresponding to the beam sweeping.

9. The method of claim 1, wherein the first UE generates the special slot including beam sweeping information in response to counting a consecutive number of NACK signals received at the first UE or based on a request received from the second UE.

10. The method of claim 1, further comprising:
receiving, from the second UE, an indication of a first set of multiple beamform configurations for transmitting and receiving data; and
receiving, from a third UE, an indication of a second set of multiple beamform configurations for transmitting and receiving data,
wherein configuring the first UE according to the beamform configuration of the one or more beamform configurations is based on an overlap between the first set of multiple beamform configurations and the second set of multiple beamform configurations.

11. The method of claim 1, wherein configuring the first UE to transmit and receive FR2 SL transmissions according to the beamform configuration comprises adjusting a beam width of the beamform configuration.

12. The method of claim 11, wherein adjusting the beam width of the beamform configuration comprises widening a beam width in response to a reduction in latency when searching for alternative beams.

13. The method of claim 11, wherein adjusting the beam width of the beamform configuration comprises narrowing a beamwidth to improve a link quality between the first UE and the second UE when a relative distance between UEs is stable or shrinking.

14. The method of claim 1, wherein the first UE is further configured to transmit and receive PSSCH signals with the second UE over FR2 and PSCCH signals over FR1.

15. The method of claim 1, wherein the one or more beamform configurations comprises at least a first beamform configuration including a first width for PSCCH transmissions and a second beamform configuration including a second width that is different from the first width for PSSCH transmissions.

16. The method of claim 1, wherein:
the one or more beam measurement reference signals corresponds to one or more differential indexes; and
the beamform configuration for which the first UE is configured to transmit and receive FR2 SL transmissions is determined based on at least one differential indexes received from the second UE and a previous beamform configuration of the first UE.

17. The method of claim 1, wherein first UE comprises a dedicated resource pool for sending and receiving beam measurement reference signal transmissions.

18. A method comprising:
receiving, by a second user equipment (UE), one or more beam measurement reference signals corresponding to one or more beamform configurations for transmitting frequency range 2 (FR2) sidelink (SL) transmissions to a first UE;
generating, by the second UE, based at least in part on the one or more beam measurement reference signals received, beam-form candidate data corresponding to a preferred-candidate beamform configuration to transmit and receive FR2 SL transmissions with the first UE;
configuring the second UE to accept a beamform configuration based on the beam-form candidate data generated; and
transmitting from the second UE to the first UE a decodable bit-signal for configuring the first UE to transmit and receive FR2 SL transmissions.

19. The method of claim 18, further comprising:
receiving, from the first UE, multiple repetitions of the one or more beamform configurations; and
sweeping, by the second UE, the one or more beamform configuration received from the first UE to direct a receiving beam of the second UE.

20. A system comprising:
a second user equipment (UE) configured to generate beamform candidate data in response to receiving beam data corresponding to one or more beamform configurations; and
a first UE configured to:
determine one or more beam measurement reference signals corresponding to one or more beamform configurations for transmitting frequency range 2 (FR2) sidelink (SL) transmissions to the first UE,
wherein a special slot within a regular resource pool comprises the one or more beam measurement reference signals and the one or more beam measurement reference signals relate to the one or more beamform configurations; and
configure the first UE, based on the beamform candidate data received from the second UE, to transmit and receive FR2 SL transmissions with the second UE according to at least a beamform configuration of the one or more beamform configurations,
wherein configuring the first UE to transmit and receive FR2 SL transmissions according to the beamform configuration is further based on a decoding of a bit-signal received from the second UE.

* * * * *